UNITED STATES PATENT OFFICE.

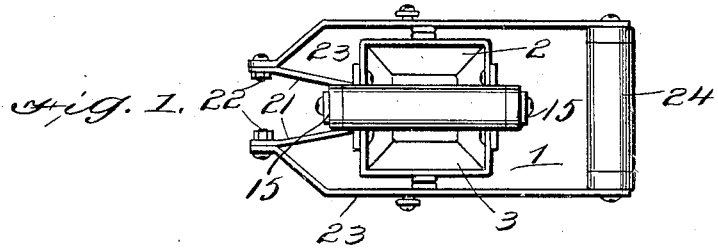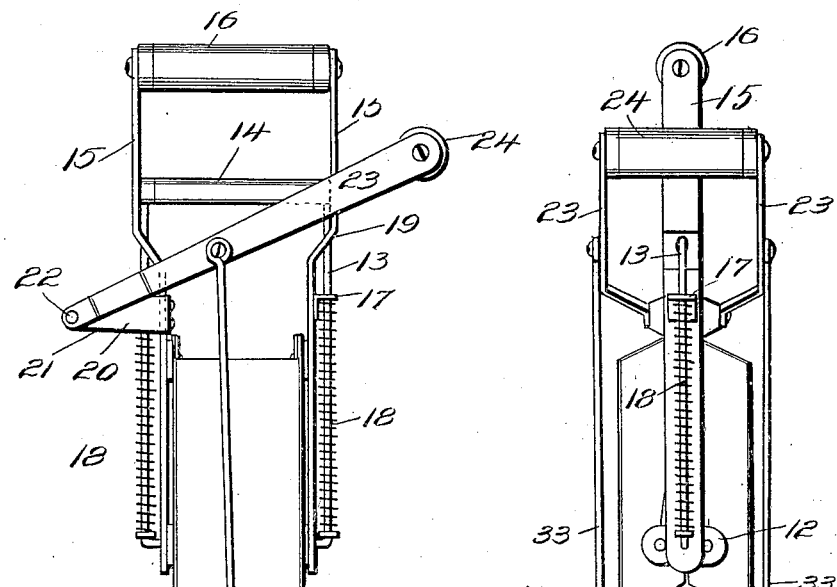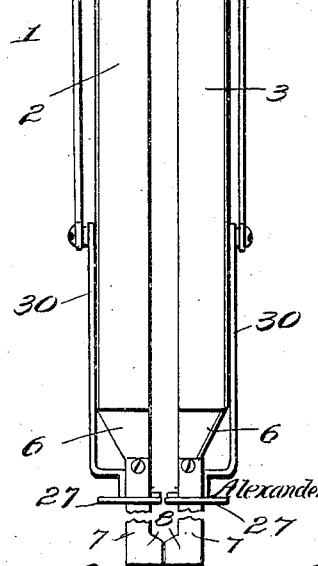

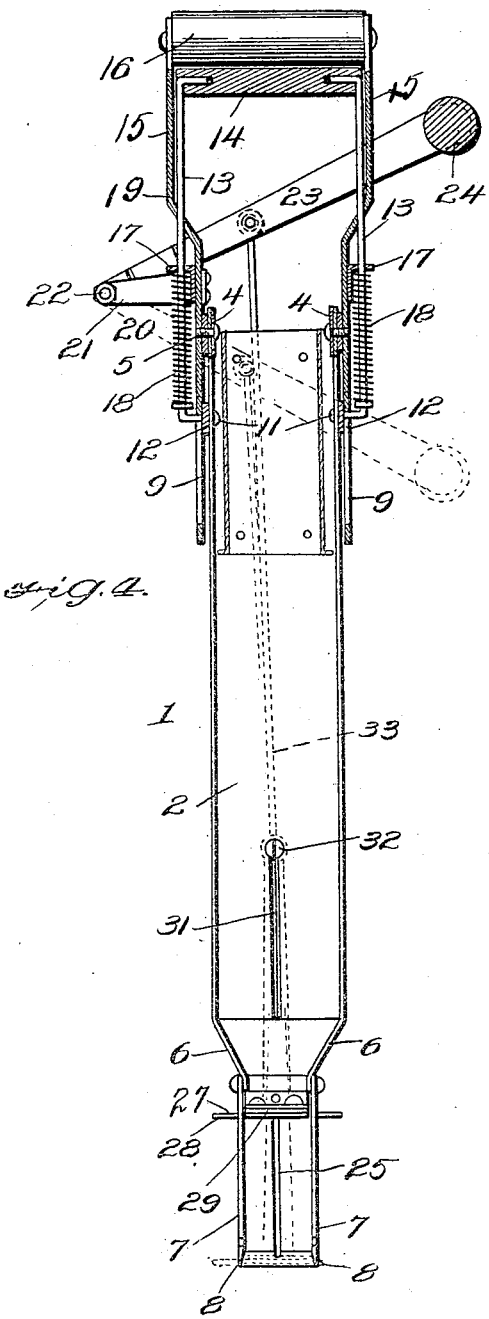
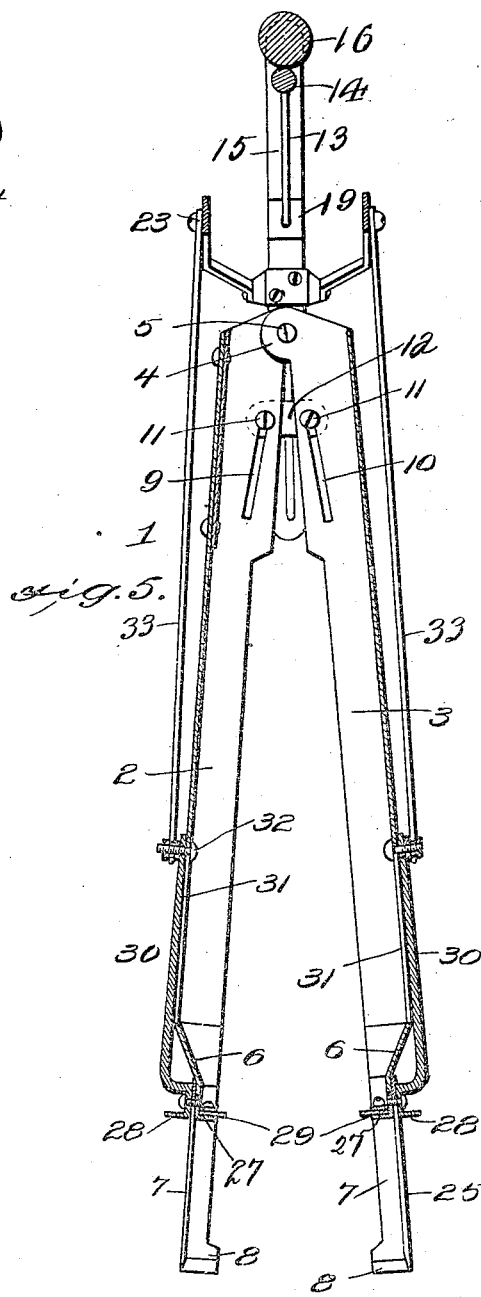

ALEXANDER C. RUMBLE, OF SAN JOSE, CALIFORNIA, ASSIGNOR OF ONE-HALF TO ERNEST H. WUHRMANN, OF SAN JOSE, CALIFORNIA.

TRANSPLANTER.

960,113.   Specification of Letters Patent.   Patented May 31, 1910.

Application filed June 29, 1909.   Serial No. 505,101.

*To all whom it may concern:*

Be it known that I, ALEXANDER C. RUMBLE, a citizen of the United States, residing at San Jose, in the county of Santa Clara and State of California, have invented new and useful Improvements in Transplanters, of which the following is a specification.

This invention relates to improvements in transplanting devices and is primarily directed for use in transplanting eucalyptus seedlings from the propagating boxes or "flats" as they are technically known to the forest plantation and the principal object of the invention is to provide a device of this character which is designed to cut out each plant separately, taking with the roots all the earth or soil belonging to it in the "flat" and deposit the same in the hollow or excavation made to receive it, in its proper position in the plantation.

With the above and other objects in view, which will appear as the description progresses the invention resides in the novel construction and combination of parts hereinafter fully described and claimed.

In the accompanying drawings there has been illustrated a simple and preferred embodiment of the invention and in which, Figure 1 is a top plan view of the device. Fig. 2 is a front elevation of the same. Fig. 3 is a side elevation. Fig. 4 is a central vertical transverse sectional view of Fig. 3. Fig. 5 is a section taken transversely of the device illustrated in Fig. 2 and showing the gathering jaws opened to gather the seedling.

As is well known in the art small shrubs are propagated from the seed placed in boxes commonly known as "flats." These flats are eighteen inches square and three inches deep and contain between one hundred and one hundred forty four plants set in regular rows, each one being nearly two inches apart in the first instance and one and one half inches apart in the latter instance. This device is designed to cut out each plant separately taking with the roots all the earth or soil belonging to it in the flat without interfering with the other seedlings and the device is so constructed as to thoroughly compress the earth around the root of the plant so as to allow the same to be carried to the place where it is to be set without danger of loosening the soil or injuring the plant.

The device is also provided with a suitable stripping apparatus which compresses the earth around the plant when the latter is to be removed from the apparatus and which also prevents the exposure of the roots to the atmosphere.

In the drawings the numeral 1 designates a transplanter. This transplanter 1 comprises a pair of substantially U-shaped arms 2 and 3. These arms 2 and 3 have their upper side walls provided with ears 4 having openings adapted for the reception of threaded members 5 whereby the said arms are pivotally connected together. The lower portions of the arms 2 and 3 are each bent inwardly toward each other as indicated by the numeral 6 and are each provided with a substantially cross sectional U-shaped knife member 7. Each of these knife members 7 has the lower edges of its sides projecting toward each other as indicated by the numeral 8 so that when the device is folded or in its closed position as shown in the several figures of the drawing the said projections 8 form a stop to allow a suitable space between the knives corresponding with the space between the meeting edges of the arms 2 and 3. The sides of the members 2 and 3 below the pivot 5 are provided with outwardly inclined slots 9 and 10, and these slots are adapted for the reception of headed pintles 11 secured upon a member 12, which is connected through the medium of suitable rods 13 with a handle 14. By this arrangement it will be noted that when the handle 14 is raised away from the arms 2 and 3 the said arms will be caused to spread apart as illustrated in Fig. 5 of the drawings.

Connected to the side members 2 and 3 through the medium of the pintle 5 is a pair of upstanding arms 15 having their upper extremities connected by a handle member 16. These bars 15 project a suitable distance adjacent the members 2 and 3 and are provided with vertically arranged slots whereby the offset members of the rods 13 connecting the members 12 having the pintles 11, may be free to slide. The arms 15 are each provided with an L-shaped bracket 17, which is adapted to serve as a stop for the spring 18. This spring 18 is adapted to exert pressure between the bracket 17 and the offset portion of the rod 13, so as to normally force the jaws into closed position upon each other.

It will be noted by reference to the several figures of the drawings that the arms 15 have their upper portions offset or spread away from each other. The angular portions 19 are provided with suitable openings and these openings are adapted for the reception of the upper portions of the rods 13, thus positioning the handle 14 directly below and in a plane with the handle 16. One of the arms 15 is provided with a member 20 having oppositely disposed outwardly extending arms 21. These arms 21 are each provided with suitable perforations and these perforations are adapted for the reception of suitable pintles 22 provided upon offset arms 23 connected by a handle 24. The knife members 7 have their faces provided with vertically extending slots 25 and these slots are adapted for the reception of a pintle 26 carried upon a stripper member 27, as clearly illustrated in Figs. 3, 4 and 5. This stripper member comprises an outer and an inner section designated by the numerals 28 and 29 and the inner members 29 are adapted to extend a slight distance away from each other when the device is closed, thus providing for the reception of the stem of the plant above the root or bulb carried by the knife members in a manner hereinafter to be described.

The stripper members have their outer members 28 extending entirely around the knife members 7 and are provided with vertical extensions 30. The faces of the arms 2 and 3 are each provided with a vertically arranged slot 31 and this slot is adapted for the reception of a threaded pintle 32 which extends through a suitable opening in the top of each of the extensions 30 and engages a rod 33 pivotally connected with the arms 23.

In removing a seedling from the flat the handle 14 is drawn upwardly toward the handle 16, thus causing the arms or jaws to spread apart. The knives are then inserted within the soil of the propagating box around the seedling and the handle 14 released, thus allowing the springs 18 to force the jaws toward each other and compress the soil around the root of the plant, while the foliage is positioned between the U-shaped arms 2 and 3. The seedling is thus firmly retained in position within the device and can be carried to its place or setting by the handle 16.

It is to be understood that a hole is drilled into ground for the reception of the seedling and when the device carrying the seedling is positioned within the hole the handle 24 is swung downwardly upon its pivot 22 causing the stripper 27 to be slid downwardly within the slot 25, thus effectively and securely packing the dirt around the root of the seedling.

From the above description, taken in connection with the accompanying drawings it will be noted that I have provided a comparatively simple, cheap and effective device for the purpose intended, one which may be easily and quickly operated without danger to the plant, one which compresses the earth around the seed of the plant when removing the same and one which effectively deposits all of the soil surrounding the seed when the latter is transplanted.

It is to be further understood that while I have illustrated and described the preferred embodiment of the invention as it now appears to me minor details of construction within the scope of the following claims may be resorted to when desired.

Having thus fully described the invention what is claimed as new is:

1. A pair of cross sectionally U-shaped arms hingedly connected together, automatic means for normally closing the arms against each other, substantially U-shaped knife members carried by the arms, and sliding ejectors upon the knives.

2. A pair of substantially U-shaped arms pivotally connected together, U-shaped knife members carried by each of the arms, ejectors upon the knives, means for operating the ejectors, a handle for the arms, automatic means for normally forcing the arms into engagement with each other, and means for spreading the arms and the knives carried thereby.

3. A pair of cross sectionally U-shaped arms, cross sectionally U-shaped knife members carried by the arms, said knife members having their lower portions offset toward each other, sliding ejectors upon the knives, means for operating the ejectors, automatic means for closing the arms together, and a handle for the arms.

4. A pair of cross sectionally U-shaped arms hingedly connected together, the upper portion of the arms adjacent their pivots being enlarged, knife members secured to the lower portions of each of the arms, sliding ejector members for the knives, means for operating the ejectors, the enlarged sides of the arms being provided with angular cut away portions, a substantially U-shaped handle member having its lower extremities bent to engage within the angular cut away portions of the arms, and a handle for the arms.

5. A pair of cross sectionally U-shaped arms having their upper side portions enlarged and pivotally connected together, said enlarged portions being each provided with oppositely disposed slots, a handle for the arms, a second handle having downwardly extending arms for the device, the extremity of the said arms being bent inwardly to engage the angular slots of the main arms, offset plates upon the sides of the handle for the arms, tension members between these plates and the offsets of the secondary handle, substantially U-shaped knife members upon the lower portion of each of the arms, said knife members each having its opposite faces slitted longitudinally, ejector members projecting upon each side of the knife members slidably mounted within the cut away portions, the opposite faces of the arms having their lower portions provided with a longitudinally extending groove, a member having a headed portion engaging the grooves and connecting the ejector members, a bail pivotally connected with the upper portion of one of the arms of the main handle, and rods secured to the bail and connecting the headed members mounted within the slots at the lower portion of the arms.

In testimony whereof I affix my signature in presence of two witnesses.

ALEXANDER C. RUMBLE.

Witnesses:
FRANK M. LEECH,
CHARLES M. LEECH.